(12) United States Patent
Rastogi et al.

(10) Patent No.: US 10,503,558 B2
(45) Date of Patent: Dec. 10, 2019

(54) ADAPTIVE RESOURCE MANAGEMENT IN DISTRIBUTED COMPUTING SYSTEMS

(71) Applicant: HUAWEI TECHNOLOGIES CO., LTD., Shenzhen, Guangdong (CN)

(72) Inventors: Priyank Ashok Rastogi, Karnataka (IN); Naganarasimha Ramesh Garla, Karnataka (IN); Rohith Sharma K Shivashankara, Karnataka (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/245,823

(22) Filed: Jan. 11, 2019

(65) Prior Publication Data
US 2019/0146848 A1 May 16, 2019

Related U.S. Application Data

(63) Continuation of application No. PCT/CN2017/091506, filed on Jul. 3, 2017.

(30) Foreign Application Priority Data

Jul. 13, 2016 (IN) .............................. 201641024001

(51) Int. Cl.
*G06F 9/46* (2006.01)
*G06F 9/50* (2006.01)
*G06F 9/48* (2006.01)

(52) U.S. Cl.
CPC ............ *G06F 9/5061* (2013.01); *G06F 9/485* (2013.01); *G06F 9/4881* (2013.01);
(Continued)

(58) Field of Classification Search
CPC ...... G06F 9/5061; G06F 9/485; G06F 9/4881; G06F 9/5016; G06F 2209/5019
See application file for complete search history.

(56) References Cited

U.S. PATENT DOCUMENTS

| 7,093,004 B2 | 8/2006 | Bernardin et al. |
| 7,334,228 B2 * | 2/2008 | Clohessy .............. G06F 9/5016 718/104 |

(Continued)

FOREIGN PATENT DOCUMENTS

| CN | 102223419 A | 10/2011 |
| CN | 103593242 A | 2/2014 |

(Continued)

OTHER PUBLICATIONS

International Search Report and Written Opinion issued in International Application No. PCT/CN2017/091506 dated Sep. 11, 2017, 12 pages.

(Continued)

*Primary Examiner* — Camquy Truong
(74) *Attorney, Agent, or Firm* — Fish & Richardson P.C.

(57) ABSTRACT

The present disclosure provides a framework for adaptive resource handling of applications being executed in distributed systems so as to ensure efficient resource utilization. The present disclosure provides a framework: to enable a client to participate in identifying application uniquely using tags such that resource adaptation is more effective, to collect and store resource statistics for an application task against various parameters, to monitor resources done based on historical statistics collected, to resource management is done based on historically identified resource usage limits, and if exact match for the records are not found then based on confidence score the limits are identified, and to enable each resource manager (RM) agent to receives the workers to be launched with both limits: given by the application (hard limit) and by the historical statistics (soft limit).

19 Claims, 15 Drawing Sheets

(52) U.S. Cl.
CPC .......... *G06F 9/5016* (2013.01); *G06F 9/5027* (2013.01); *G06F 2209/504* (2013.01); *G06F 2209/508* (2013.01); *G06F 2209/5019* (2013.01)

(56) References Cited

U.S. PATENT DOCUMENTS

| | | | |
|---|---|---|---|
| 7,571,438 B2 * | 8/2009 | Jones | G06F 9/5011 |
| | | | 718/102 |
| 8,195,739 B2 | 6/2012 | Bernardin et al. | |
| 8,856,797 B1 | 10/2014 | Siddiqui et al. | |
| 10,338,971 B2 * | 7/2019 | Arigaya | G06F 9/5061 |
| 2013/0227582 A1 | 8/2013 | Daly et al. | |
| 2017/0235773 A1 * | 8/2017 | Maturi | G06F 16/00 |
| | | | 707/736 |

FOREIGN PATENT DOCUMENTS

| | | |
|---|---|---|
| CN | 104281496 A | 1/2015 |
| EP | 2725862 A1 | 4/2014 |

OTHER PUBLICATIONS

Extended European Search Report issued in European Application No. 17826901.5 dated May 24, 2019, 9 pages.

\* cited by examiner

FIGURE 1 (PRIOR-ART)

FIGURE 2 (PRIOR-ART)

ADAPTIVE RESOURCE MANAGEMENT IN DISTRIBUTED COMPUTING SYSTEMS

CROSS-REFERENCE TO RELATED APPLICATIONS

This application is a continuation of International Application No. PCT/CN2017/091506, filed on Jul. 3, 2017, which claims priority to Indian Patent Application No. IN201641024001, filed on Jul. 13, 2016. The disclosures of the aforementioned applications are hereby incorporated by reference in their entireties

TECHNICAL FIELD

The present disclosure described herein, in general, relates to resource management, and more particularly, to systems, methods, and devices for managing computer resources in a distributed computing system.

BACKGROUND

With the rapid advances in network technologies, distributed computing has become an increasingly popular computing approach as it allows sharing of computational resources (for example, memory, processing time, input/output, etc.) among many different users or systems or any combination thereof. One such example is "cloud computing", which involves applying the resources of several computers in a network to a single problem at the same time. Cloud computing is Internet ("cloud") based development and use of computer technology ("computing"). Conceptually, infrastructure details are abstracted from the users and/or systems that no longer need knowledge of, expertise in, or control over the technology infrastructure "in the cloud" that support them. It typically involves the provision of dynamically scalable and often virtualized resources as a service over the Internet.

A distributed system (also be called as cluster) contains a set of resources interconnected by a network. Resource Manager controls the assignment of available resources to distributed applications running on at least one cluster. FIG. 1 show shows a broad level diagram of the resource manager controlling the assignment of available resources to distributed applications running on the cluster. As shown in FIG. 1, the major components that are involved are resource manager (RM), application manager (AM), RM agent, and task executor running on the RM Agent source like computer. The resource manager keeps track of live RM-agents and available resources. It allocates available resources to applications and tasks based on resource requirements specified by the application manager. The AM coordinates execution of all tasks within the application life cycle, asks for containers to run tasks, sends "Resource Request" to "Resource Manager". The resource request can specify required resources like memory, CPU, etc. User provides the resource requirement for the task-executors (tasks) of the distributed application. The RM agent sends periodic updates to "RM" about available resources on the host/RM Agent, start "task-executor" process on host, based on resources allocated by "resource manager" on the host, and monitors resource usage of "task-executor". The task executor is responsible for execution of different type of application tasks, and each task can have different resource (e.g. RAM, CPU) demands.

FIG. 2 shows distributed execution flow for resource allocation as available in the prior-art. As shown in FIG. 2, the resource managers have mechanism to kill rogue tasks that consume resources more than allocated. The tasks request for high resources (CPU, Memory, etc) to avoid getting killed as actual resource usage is always less than requested amount of resources. The resource manager calculates available resources based on resources allocated for execution of a particular task and not based on actual resources used for execution. This type of calculation results in under-utilization of cluster resources. Further, an administrator is required to manually analyze and identify if resources are underutilized, and then do the required change in the configurations for next run and optimize the resource usage which is not practical for large clusters.

In spite of the available mechanisms, the prior-art techniques have certain critical issues as the applications that are not utilizing the allocated resources results in resource under-utilization. Further, the administrator has to manually monitor the resource utilization statistics from history data, and tune the client resource requests. This process of monitoring is tedious and complex process in a large cluster with wide variety of applications which increases cost of operations staff. Also, the resource under utilization results in deploying more nodes in the cluster with higher configuration hardware, which leads to higher cost for vendors as they need to invest more on hardware. So effective utilization of resources is not taken into account.

SUMMARY

This summary is provided to introduce concepts related to adaptive resource management in distributed computing systems, and the same are further described below in the detailed description. This summary is not intended to identify essential features of the claimed subject matter nor is it intended for use in determining or limiting the scope of the claimed subject matter.

A main objective of the present invention is to solve the technical problem as recited above by providing a system, method, and devices for adaptive resource management which automatically monitors, analyzes and allocates the application resources based on historical application run In one aspect, the present disclosure provides a system, method, and device to collect and store resource statistics for each unique application's task against various parameters like node type (for example hardware type), priority.

In another aspect, the present disclosure provides a system, method, and device for identifying application uniquely through tags and the historic status are collected against these tags, such that resource adaptation is more effective.

It is to be understood and noted that, the hard limit is the resource limit which is specified by the user based on which the resources limited and if exceeds system tries to kill the resources. Similarly, the soft-limit is a statistical calculated limit based on previous runs. So the system scheduling will be done based on the soft-limit and tries to negotiate for more resources till the hard limit. The same logical meaning of the hard-limit and soft-limit is used throughout the preceding description of the present invention.

In another aspect, the present disclosure provides a system, method, and device that enables a flexible resource utilization limit (soft limit) to be determined based on historical statistics collected, and if exact matching history records are not found then evaluate a probable soft limit based on confidence score.

In another aspect, the present disclosure provides a system, method, and device for launching the task executers for executing the tasks based on the identified soft limits and not based on the user configured limits. Thus extra free resources can be utilized for other task executers.

In another aspect, the present disclosure provides a system, method, and device for dynamic resource resizing wherein, when the task executers are using the resources greater than the soft limit, the application will not be killed immediately but will be allowed to grow in stages till the resource utilization reaches the user configured limit (hard limit) by negotiating with the resource manager as long as resources are available. The RM Agents ensures that the resource utilization does not exceed the hard limit.

Accordingly, in one implementation, the present disclosure provides a system for adaptive resource management. The system comprises a resource manager and a task executor resource monitoring module residing in at least a RM Agent. The resource manager is configured to receive at least one resource request from at least an application, the application is received with at least an application name and a tag, and the resource request contains at least a resource requirement of an application task for execution. The resource manager also comprises a resource prediction module configured to provide at least a soft limit for application task based on at least a historical resource usage statistics pre-stored in a history data store or return to a hard limit for application task configured by at least one user; and allocate at least resource from the RM Agent identified for execution. The RM Agent, upon allocation, configured to execute the application task based at least on the soft limit or the hard limit, and comprises a task executor resource monitoring module configured to monitor at least a resource usage of the application task during execution; and store at least a resource usage statistics of the application task in the history data store against the tag.

In one implementation, the present disclosure provides a resource manager for adaptive resource management. The resource manager comprises a processor, and a memory coupled to the processor for executing a plurality of modules present in the memory. The plurality of modules comprises a receiving module configured to receive at least one resource request from at least an application, the application is received with at least an application name and a tag, and the resource request contains at least a resource requirement of an application task for execution; and a resource prediction module configured to provide at least a soft limit for application task based on at least a historical resource usage statistics pre-stored in a history data store or return to a hard limit for application task configured by at least one user; and allocate at least resource from at least one RM Agent identified for execution based on the soft limit or a hard limit for application task.

In one implementation, the present disclosure provides a RM Agent for executing at least one application task allocated for execution. The RM Agent comprises a processor, and a memory coupled to the processor for executing a plurality of modules present in the memory. The plurality of modules comprises a receiving module configured to receive at least an application task for execution based at least on a soft limit or a hard limit (hard limit and if possible soft limit, the hard limit will be as mentioned by a user); a task executor module configured to execute the application task, the task executor module is allocated based on the soft limit or the hard limit; a task executor resource monitoring module configured to monitor at least a resource usage of the application task during execution; and store at least a resource usage statistics of the application task in a history data store against the tag.

In one implementation, a method for adaptive resource management is disclosed. The method comprises: receiving at least one resource request from at least an application, the application is received with at least an application name and a tag, and the resource request contains at least a resource requirement of an application task for execution; identifying at least one RM Agent for the execution of the application task; providing at least a soft limit for application task based on at least a historical resource usage statistics pre-stored in a history data store or a hard limit for application task configured by at least one user; allocating at least one resource from the RM Agent identified for execution; scheduling the application task based at least on the soft limit or the hard limit; monitoring at least a resource usage of the application task during execution; and storing at least a resource usage statistics of the application task in the history data store against the tag.

In one implementation, a method for adaptive resource management, by the resource manager, is disclosed. The method comprises: receiving at least one resource request from at least an application, the application is received with at least an application name and a tag, and the resource request contains at least a resource requirement of an application task for execution; identifying at least one RM Agent for the execution of the application task; providing at least a soft limit or a hard limit (if soft limit is not available) for application task based on at least a historical resource usage statistics pre-stored in a history data store; and allocating at least resource from the RM Agent identified for execution based on the soft limit or a hard limit for application task.

In one implementation, a method for executing at least one application task allocated for execution, by the RM Agent, is disclosed. The method comprises: receiving at least an application task for execution based at least on a soft limit or a hard limit (hard limit and if possible soft limit, the hard limit will be as mentioned by a user); executing the application task, the task executor module is allocated based on the soft limit or the hard limit; monitoring at least a resource usage of the application task during execution; and storing at least a resource usage statistics of the application task in a history data store against the tag.

In contrast to the prior-art techniques, available if any, the present disclosure provides an adaptive resource handling for applications being executed in distributed systems so as to ensure efficient resource utilization by:

providing a framework in which the resource managers can participate in identifying application uniquely using tags such that resource adaptation is more effective.

providing a framework to collect and store resource statistics for each unique application's task against various parameters like Node type, User defined application and task tags etc.

providing a framework wherein resource scheduling is done based on historical statistics collected.

providing a framework where in resource management is done based on historically identified resource usage limits. If exact match for the records are not found then based on confidence score the present disclosure will identify the soft limits.

providing a framework where each RM agent receives the workers (task executors) to be launched with both limits: given by the application (hard limit) and by the historical statistics (soft limit). Further, the RM agents ensures that the task executors does not exceed its hard limits and when executors exceeds the soft limit, the RM agent tries dynamically to resize the resource allocated to the executor.

The various options and preferred embodiments referred to above in relation to the first implementation are also applicable in relation to the other implementations.

BRIEF DESCRIPTION OF THE ACCOMPANYING DRAWINGS

The detailed description is described with reference to the accompanying figures. In the figures, the left-most digit(s) of a reference number identifies the FIGURE which the reference number first appears. The same numbers are used throughout the drawings to refer like features and components.

Figure 1:
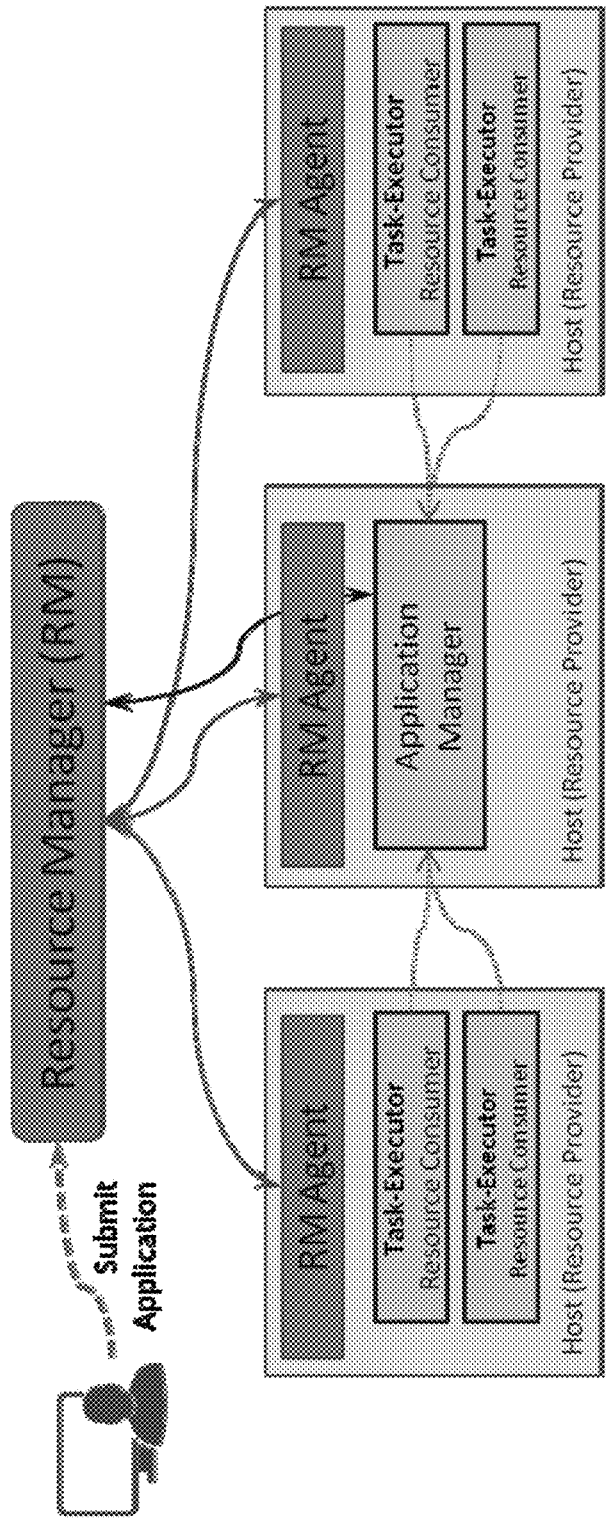
FIG. 1 illustrates a resource manager controlling the assignment of available resources to distributed applications running on the cluster as implemented in the prior-art.
Figure 2:
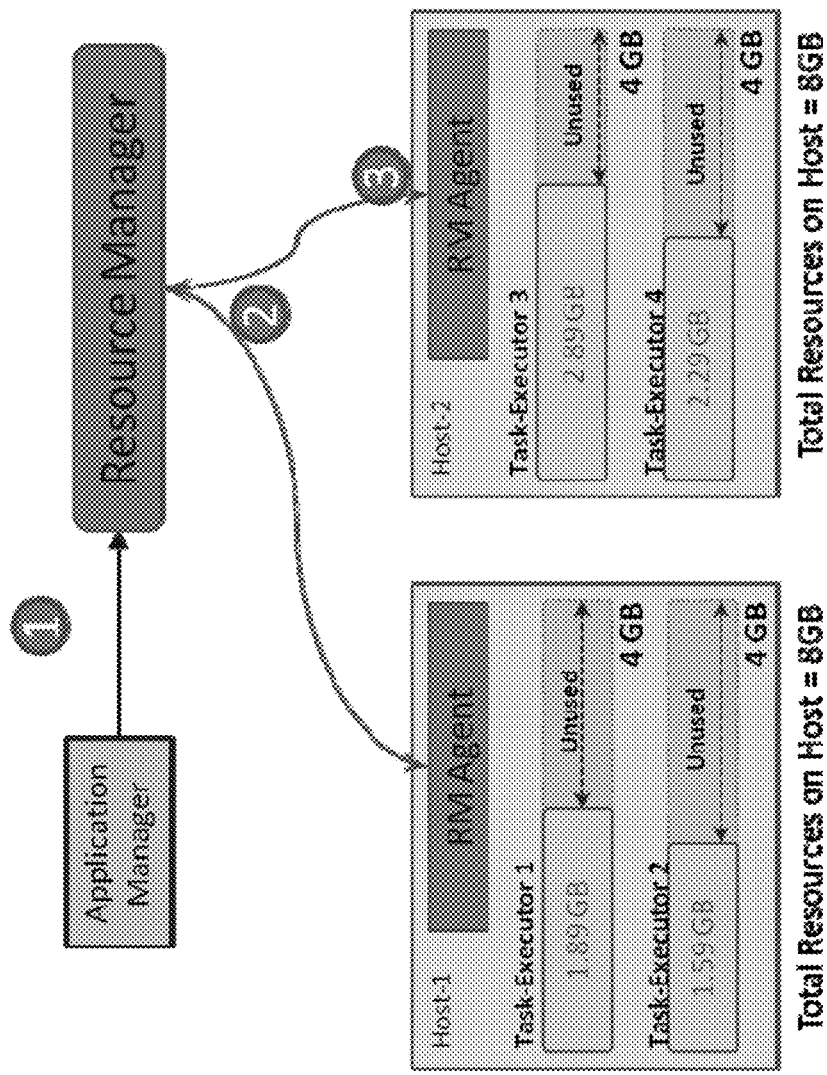
FIG. 2 illustrates a distributed execution flow for the execution if the resources allocated as implemented in the prior-art.

It is to be understood that the attached drawings are for purposes of illustrating the concepts of the invention and may not be to scale.

DETAILED DESCRIPTION OF THE PRESENT INVENTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The invention can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems, methods and devices for adaptive resource management in distributed computing systems are disclosed.

While aspects are described for systems, methods and devices for adaptive resource management in distributed computing systems, the present invention may be implemented in any number of different computing systems, environments, and/or configurations, the embodiments are described in the context of the following exemplary systems, apparatus, and methods.

In one implementation, the present invention provides a framework for Adaptive Resource management which automatically monitors, analyzes and allocates the application resources based on earlier application run history.

It is to be understood and noted that, the hard limit is the resource limit which is specified by the user based on which the resources limited and if exceeds system tries to kill the resources. Similarly, the soft-limit is a statistical calculated limit based on previous runs. So the system scheduling will be done based on the soft-limit and tries to negotiate for more resources till the hard limit. The same logical meaning of the hard-limit and soft-limit is used throughout the preceding description of the present disclosure.

Figure 3:
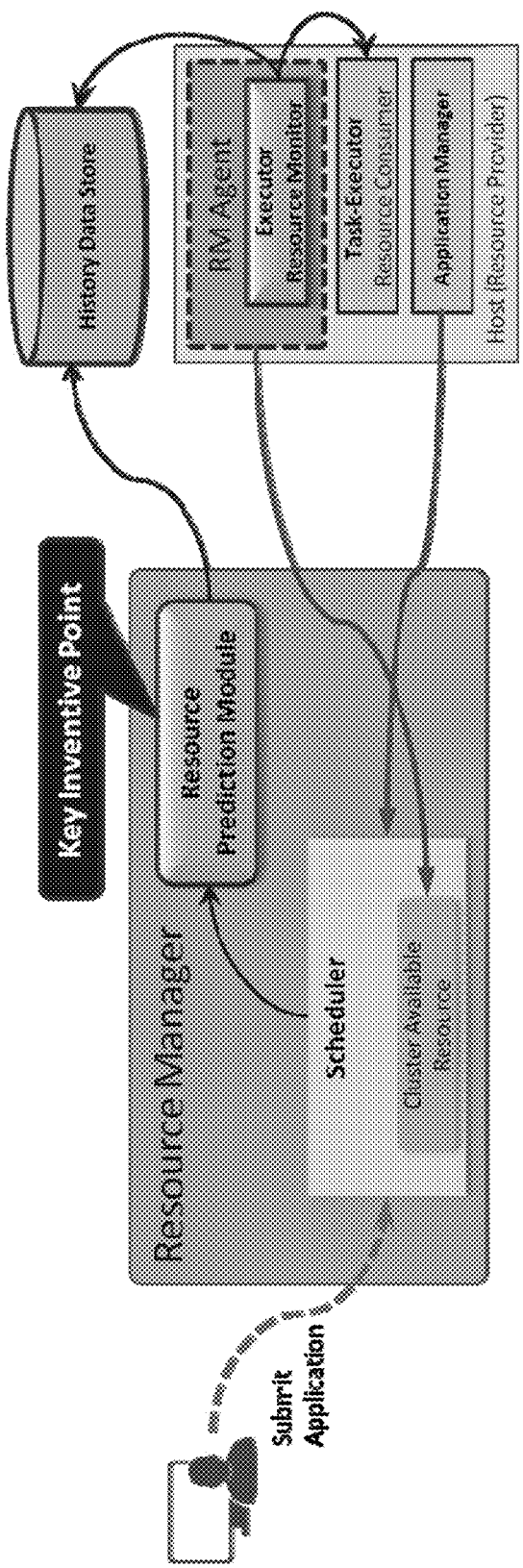
FIG. 3 illustrates a high level system realization, in accordance with an embodiment of the present subject matter.

Referring now to FIG. 3, a high level system realization, in accordance with an embodiment of the present subject matter is illustrated. A person skilled in the art after seeing FIG. 3 may clearly understand the new components or feature as provided in the present disclosure as compared to the available prior-art techniques. It may be noted that, the details of the known or irrelevant components or feature of the prior-art involved in the present disclosure are not explained in greater details, as it may increase unnecessary complexity and diversion from understanding the present disclosure. Further, it is also to be noted that details of only some components or feature that are directly related or impacting the present disclosure are explained here.

As shown in FIG. 3, the new components/features as well as modified components/features along with their specific functionality according to the present disclosure are as provided below:

Executor Resource Monitor: component/feature resides in the RM Agent or host device. The resource monitoring module according to the present disclosure is responsible for monitoring actual resource usage of task-executor but also to stores the stats in a "History Data Store".

History Data Store: This component/feature acts as a repository that stores resource usage information against an application ID, application Tags (optionally provided by the application submitter), Host-Type, etc. This repository may be implemented using Timeline Server DB, Zookeeper, etc Resource Prediction Module: This component/feature reside in the resource manager and predict "soft-limit" based on historical resource usage, and other factors like Host-Type, etc. If exacts matching records are not found then generate a confidence score for different records set and picks the best among it.

RM Agent: This component/feature reports the available resource to resource manager based on "soft-limit" identified by resource prediction module, and is also responsible to interact with RM in fetching additional resources if executor's resource limits exceeds the determined soft limits.

It is to be understood that, FIG. 3 and the associated preceding description only provides the introduction to the new features/components of the present disclosure. Each new component/feature along with their functionality and applicability will be explained in the preceding sections.

Figure 4:
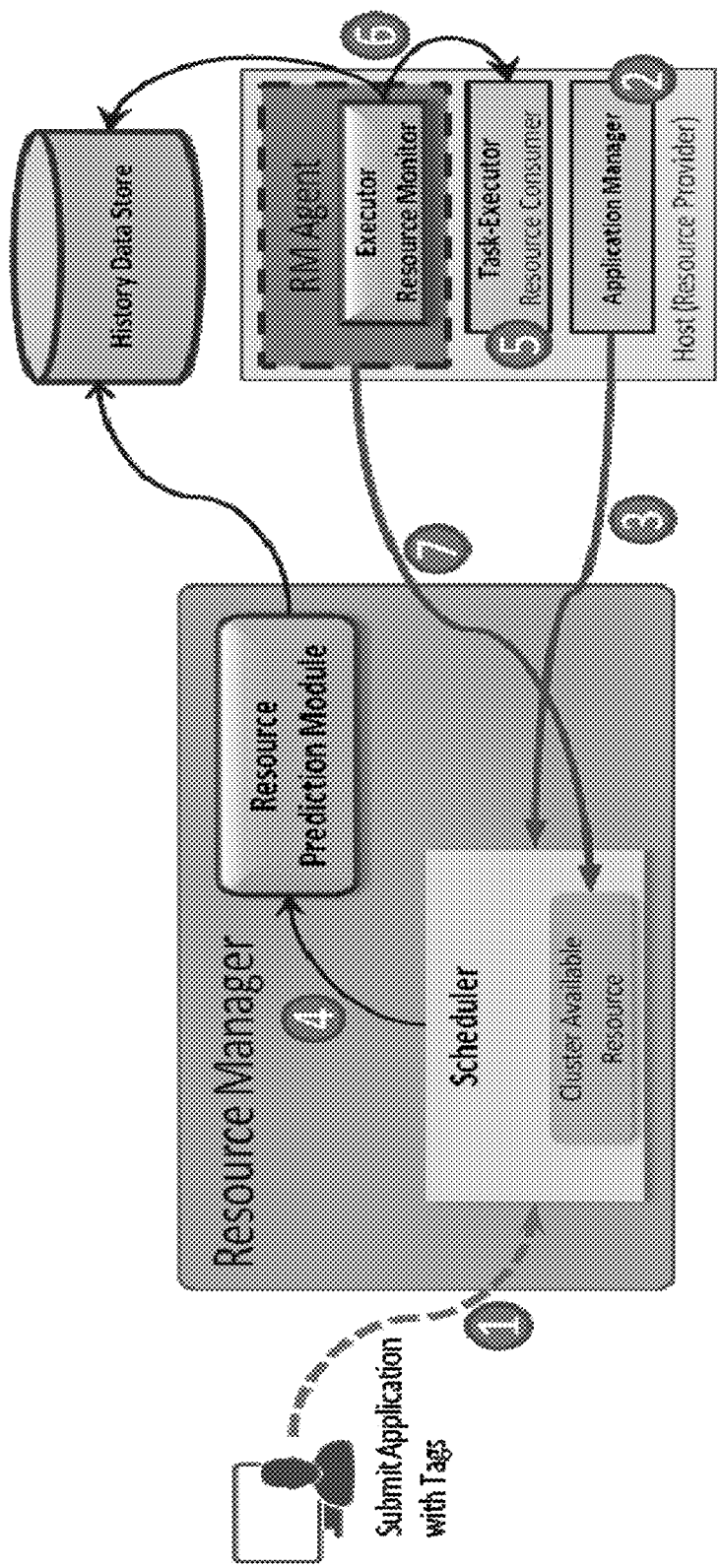
FIG. 4 illustrates the flow of resource allocation for the execution of a task, in accordance with an embodiment of the present subject matter.

Referring now to FIG. 4, the flow of resource allocation for the execution of a task, in accordance with an embodiment of the present subject matter, is illustrated. FIG. 4 shows the flow of present disclosure involving the specific functionality of all the new components or features of the present disclosure.

As shown in FIG. 4:

At step 1: The user submits an application to resource manager with tags;

At step 2: resource manager starts the application manager on a Host (via RM Agent);

At step 3: The application manager sends a resource-request to resource manager for its task-executors (tasks). Resource-request contains resource requirements of application tasks (memory, CPU, etc);

At step 4: The resource manager identifies a host node which has free resources and queries resource prediction module to provide the "soft-limit" based on historical resource usage of this application (identified uniquely by application and task ID) and other factors like task and application tags, identified host, host-type, etc i. If Historic statistics match exactly then configurable formula (like maximum, average, standard deviation etc on resource usage) can be applied and "soft-limit" is identified; or ii. If exact match is not found (Identified Host/Host-Type and/or Tags are diff), then Resource Prediction Module tries to generate a confidence score for different set of records and records with best confidence score will be selected and "soft-limit" will be derived as per step 1;

At step 5: The resource manager's scheduler allocates resources on host based on "soft-limit". The RM Agent starts task-executors on these hosts;

At step 6: The "task-executor resource monitor" monitors actual resource usage of Task-Executor, stores in "History Data Store" against Application Name and Task Type (provided by the Application manager);

At step 7: RM Agent is responsible to negotiate with RM's scheduler for additional resources if the Executor is over utilizing resources than the soft-limit till it reaches "Hard-limit". Once it reaches "Hard-limit" task executor will be killed.

Figure 5:
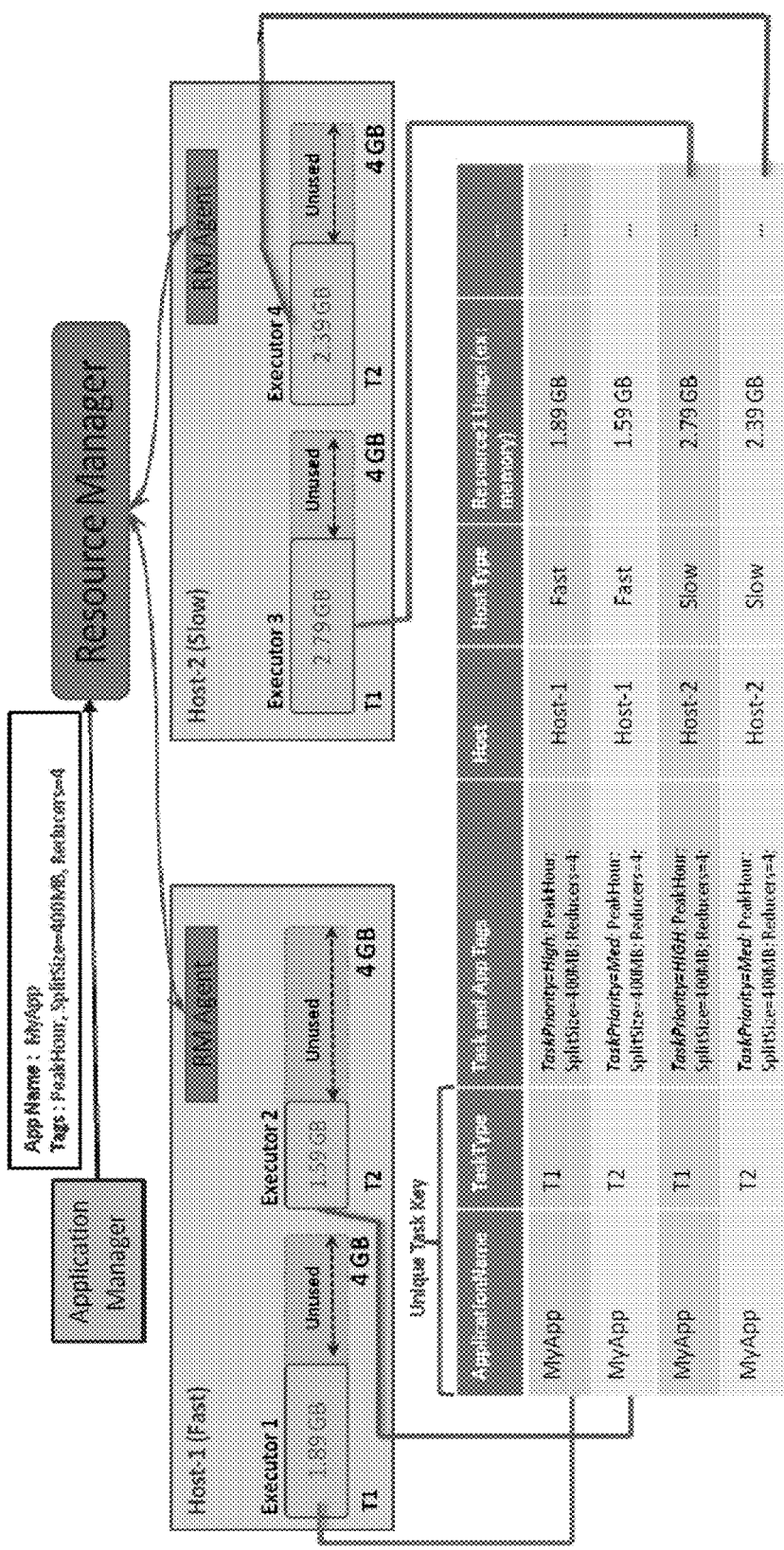
FIG. 5 illustrates populating history statistics to be stored in the history data store, in accordance with an embodiment of the present subject matter.

Referring now to FIG. 5, a populating history statistics to be stored in the history data store is illustrated, in accordance with an embodiment of the present subject matter. As shown in the FIG. 5, there may be plurality of columns storing the resource usage related statistics. Some of the columns storing the data along with their significance is as mentioned below:

Application Name and Task Type column: The application name and task type uniquely identifies a given task of an application. For e.g.: in case of Map Reduce application as shown in FIG. 5, map and reduce are 2 different task types which can have different kind of resource usages. The task type information will be provided by the application manager.

Host Type column: In most cases large clusters will be heterogeneous clusters where different nodes can be tagged. Primitive example which can consider is, categorize hosts based on number of processors and its speed as fast, medium and slow. The resource usage of a task executor on high processing hosts will be lesser than others.

Task and Application Tags column: This information is usually provided by the client or application manager. In many cases though the application is same based on the application/task configuration or the data type resource usage might differ. Based on these tags more accurate resource usage can be got. For e.g.:

i. Peak-hour Telecom data will have high cardinality of user information; hence processing user data might require more memory than off peak hour data.

ii. In case of MR jobs, based on configurations like the split size and number of reducers, resource usage of the map and reducers can differ.

Resource usage column: For each unique monitored resource what is the usage at particular poll will be stored in this column.

The person skilled in the art may understand that the above mentioned columns are mere for understand and exemplary purpose and the number and specific column may be added for storing the relevant data as per the requirement.

Figure 6:
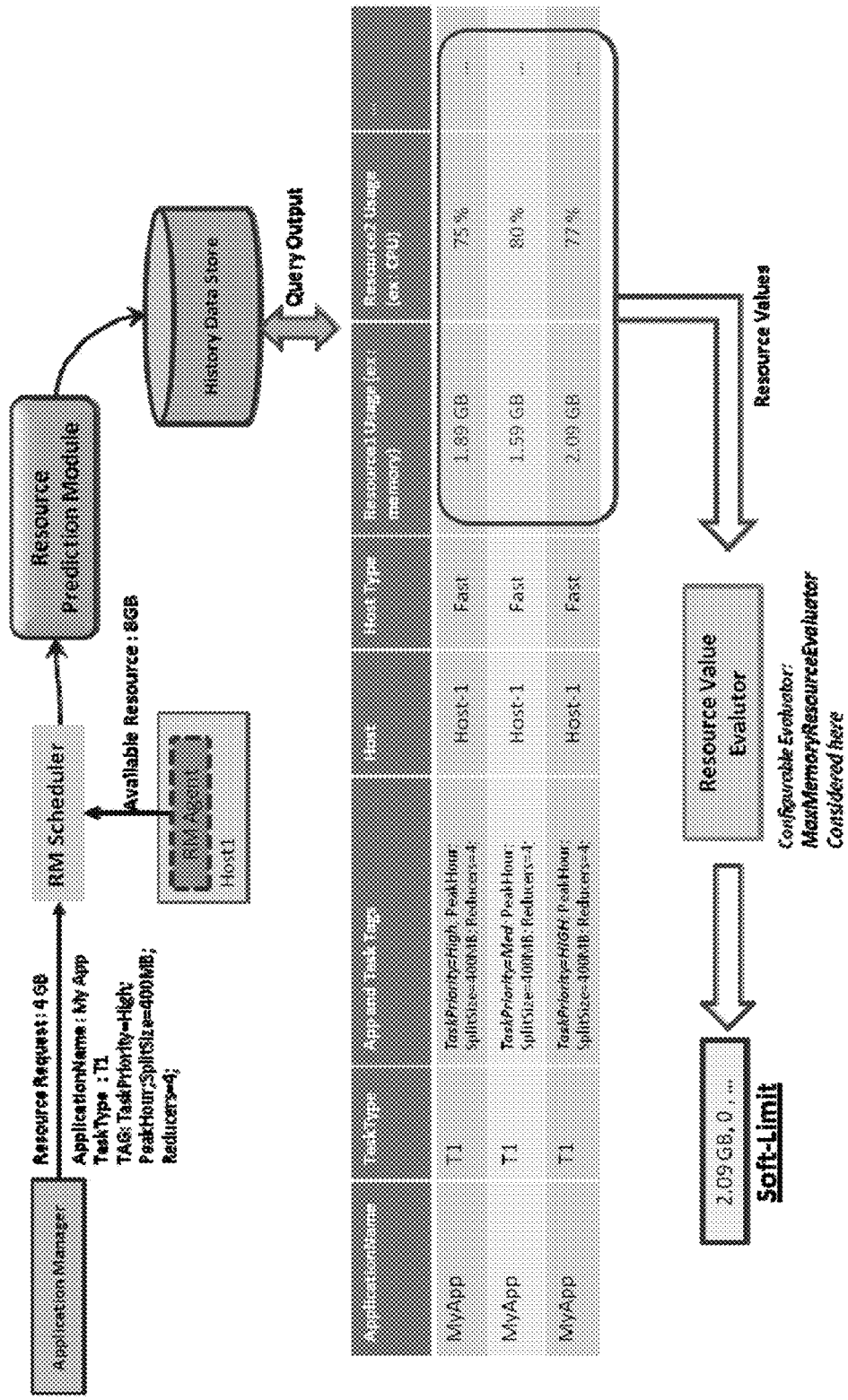
FIG. 6 illustrates an example of soft-limit evaluation on exact match, in accordance with an embodiment of the present subject matter.

Referring now to FIG. 6 an example of soft-limit evaluation on exact match is illustrated, in accordance with an embodiment of the present subject matter. As shown in FIG. 6, an application manager requests for resources with scheduler for specific application and task and provides with a set of tags and if suppose records for the same application and task with exactly matching tags is already available in the History data store, then the exactly matching records are retrieved so those records are directly found and the configurable resource values are used as evaluator to find the soft limit.

A simple resource value evaluator may be a MaxMemoryResourceValue Evaluator may take the max memory among the matching records and provides as the soft limit. Similarly the user can think of average or minimum or any statistical expressions.

Figure 7:
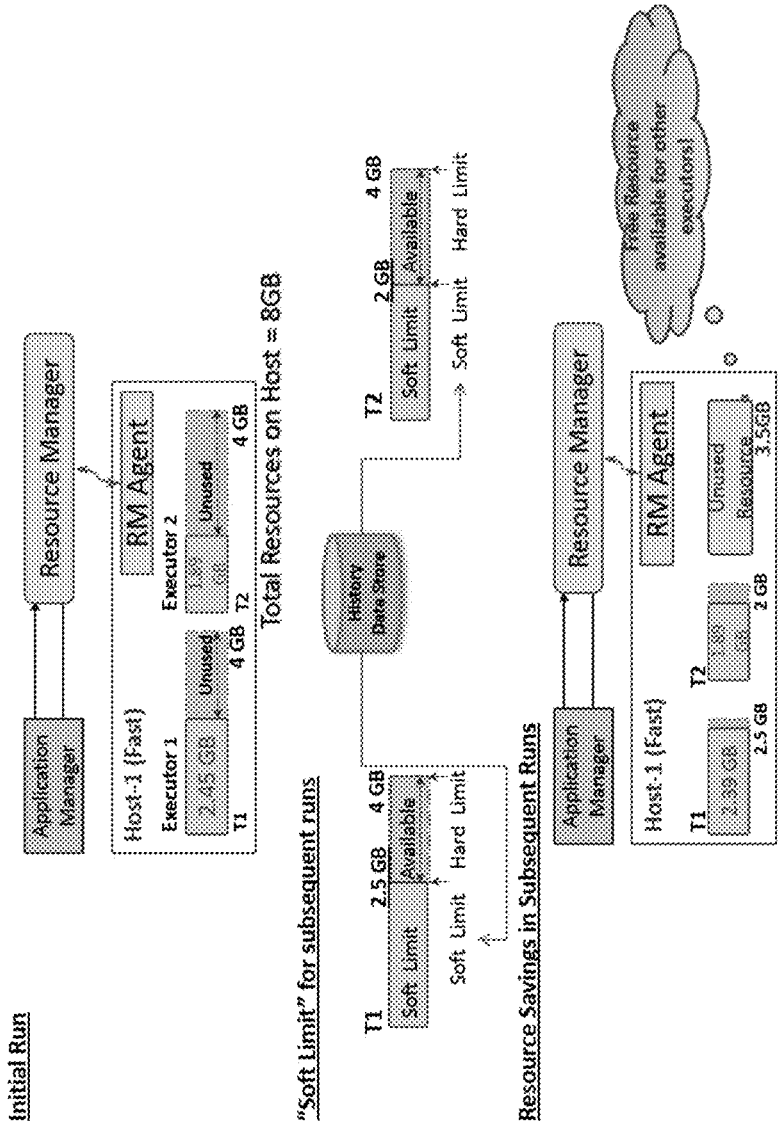
FIG. 7 illustrates an exemplary flow showing benefits of soft-limit, in accordance with an embodiment of the present subject matter.

Referring now to FIG. 7, an exemplary flow showing benefits of soft-limit is illustrated, in accordance with an embodiment of the present subject matter. As shown in FIG. 7, an exemplary flow showing benefits of soft-limit is illustrated, in accordance with an embodiment of the present subject matter. Referring now to FIG. 7, in the initial run the application manager requests resource manager with 2 tasks T1 and T2 with 4 GB memory (Hard-limit). As there is no historic data scheduling happens based on the hard limit. System monitors the executor's resource usages and stores them in the History Data Store. In the subsequent runs when the Application Manager requests Resource Manager with same tasks (T1 and T2) then scheduler refers to the previous History data store and find the calculates the soft limit as 2.5 GB and 2 GB as resource usage for the task T1 and T2 and schedules accordingly. Hence still 3.5 GB is available in the system to be utilized for other applications.

Figure 8:
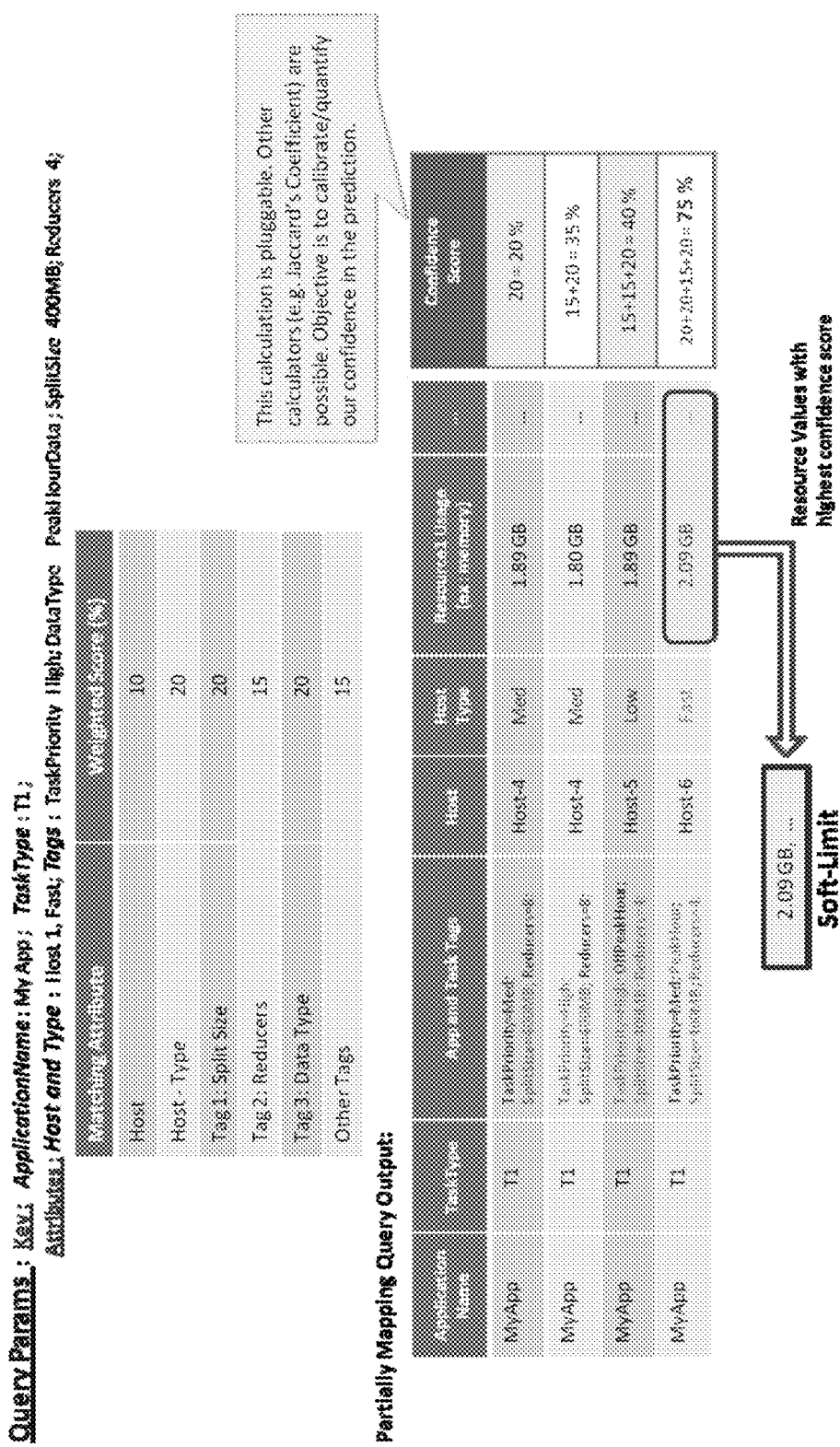
FIG. 8 illustrates an example of soft-limit evaluation based on confidence score, in accordance with an embodiment of the present subject matter.

Referring now to FIG. 8, an example of soft-limit evaluation based on confidence score is illustrated, in accordance with an embodiment of the present subject matter. In one implementation, in many cases historical data might not match exactly i.e., it may have not been stored in the data store, for such scenarios the present disclosure provides a scoring mechanism based on which Soft-limit can be selected. This scoring mechanism is pluggable and user may define one which suits the application and the cluster environment in which the applications are run. For understand purpose one such weighted algorithm is considered and the results obtained is as shown in FIG. 8. It may be also understood that the calculation is pluggable and any of the existing calculators such as jaccard's coefficient may also be used for calculation keeping ultimate objective to calibrate/quantify the confidence in the prediction. However, the person skilled in the art may understand that the jaccard's coefficient is used only as exemplary purpose and any known or new algorithms may be used for calculation.

FIGS. 9-12 shows dynamic resource resizing for task executor, in accordance with an embodiment of the present invention.

Figure 9:
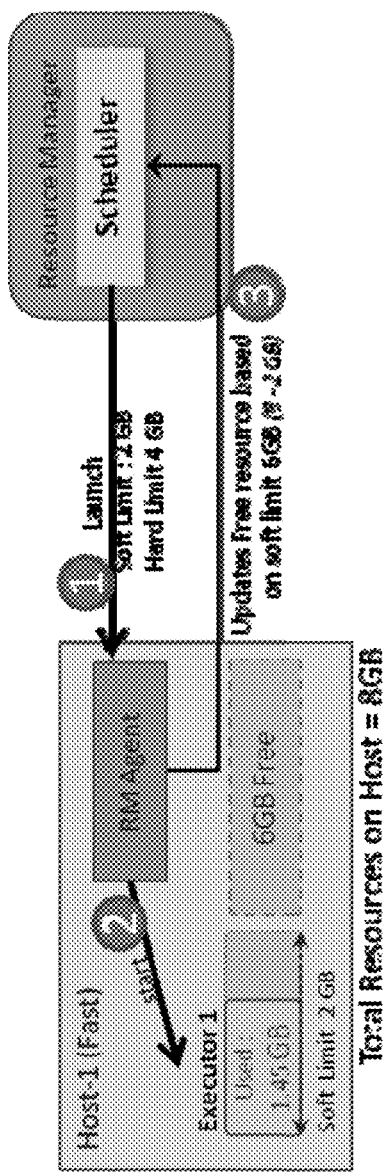
FIG. 9 illustrates a block diagram of the task launching with soft limits and updating the resource usage statistics, in accordance with an embodiment of the present subject matter.

Referring now to FIG. 9, a block diagram of the task launching with soft limits is illustrated, in accordance with an embodiment of the present subject matter. As shown in FIG. 9, in the first step, the scheduler assigns the task to be launched in the node with both limits and informs RM agent. In the next step the RM agent launches the executor, and in the next step the agent considers soft-limit for available resource calculation and updates periodically the resource usage of the executor to scheduler.

Figure 10:
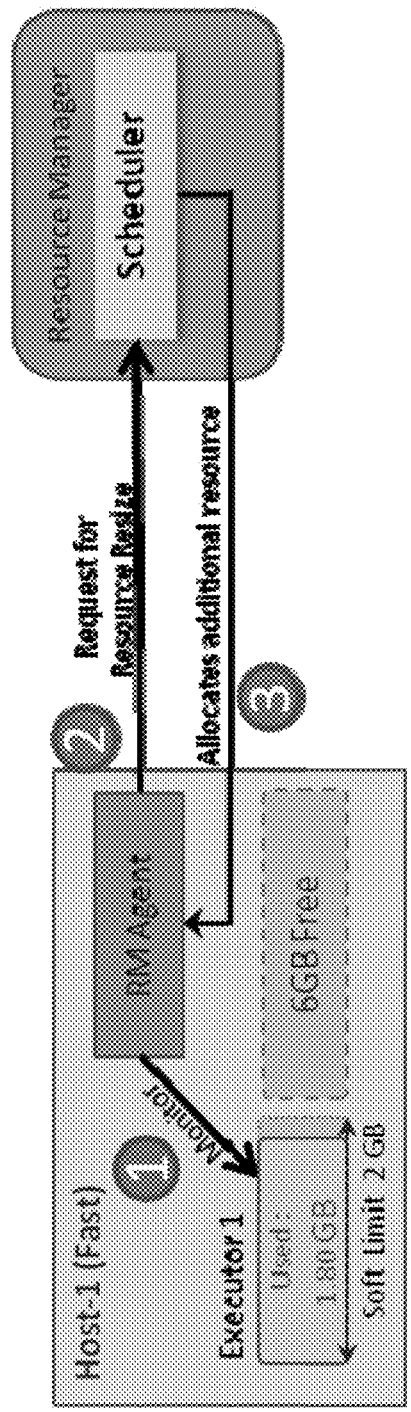
FIG. 10 illustrates a block diagram of the task executor exceeding soft-limit and capturing the approach of dynamic resizing, in accordance with an embodiment of the present subject matter.

Referring now to FIG. 10, a block diagram of the task executor exceeding soft-limit is illustrated, in accordance with an embodiment of the present subject matter. As shown in FIG. 10, the RM agent while monitoring identifies the executor is exceeding the limit (soft-limit-configurable buffer). In the next step, as used resource is less than the hard limit, it will request the scheduler for resizing the resource allocated to the executor. In the next step, the scheduler checks whether the resource has already not been allocated and if available it allocates additional resource and inform RM agent about the allocation.

Figure 11:
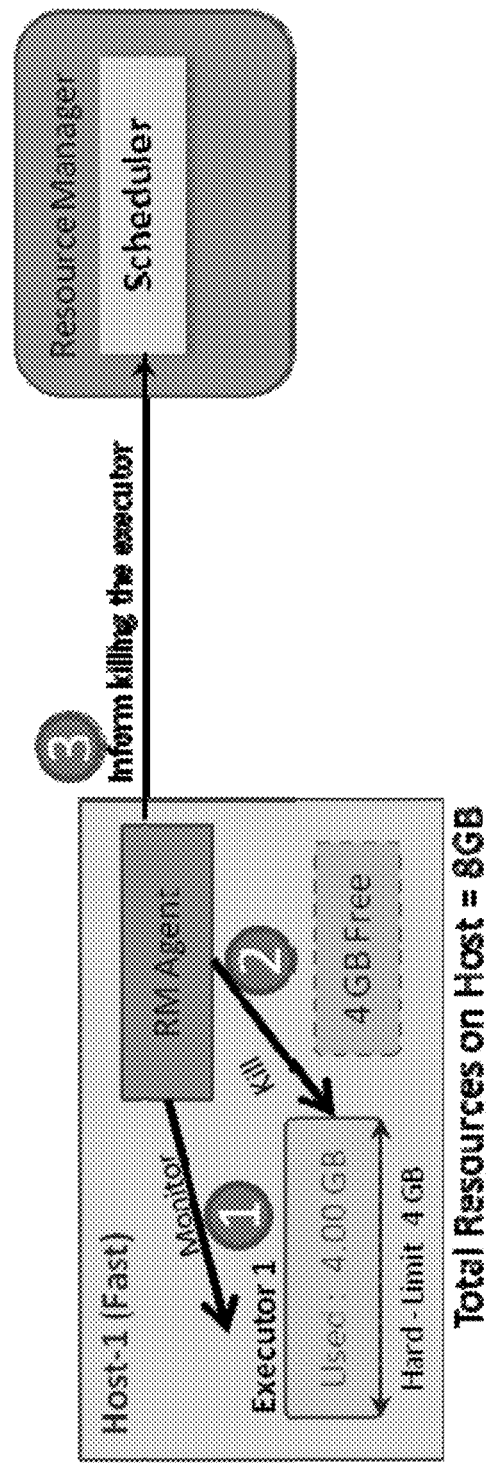
FIG. 11 illustrates a block diagram of the task executor exceeding hard-limit, in accordance with an embodiment of the present subject matter.

Referring now to FIG. 11, a block diagram of the task executor exceeding hard-limit is illustrated, in accordance with an embodiment of the present subject matter. As shown in FIG. 11, the RM agent while monitoring identifies the executor is exceeding the hard limit. In the next step the RM agent kills the executor similar to the normal flow. In the next step, the RM agent informs it to scheduler.

Figure 12:
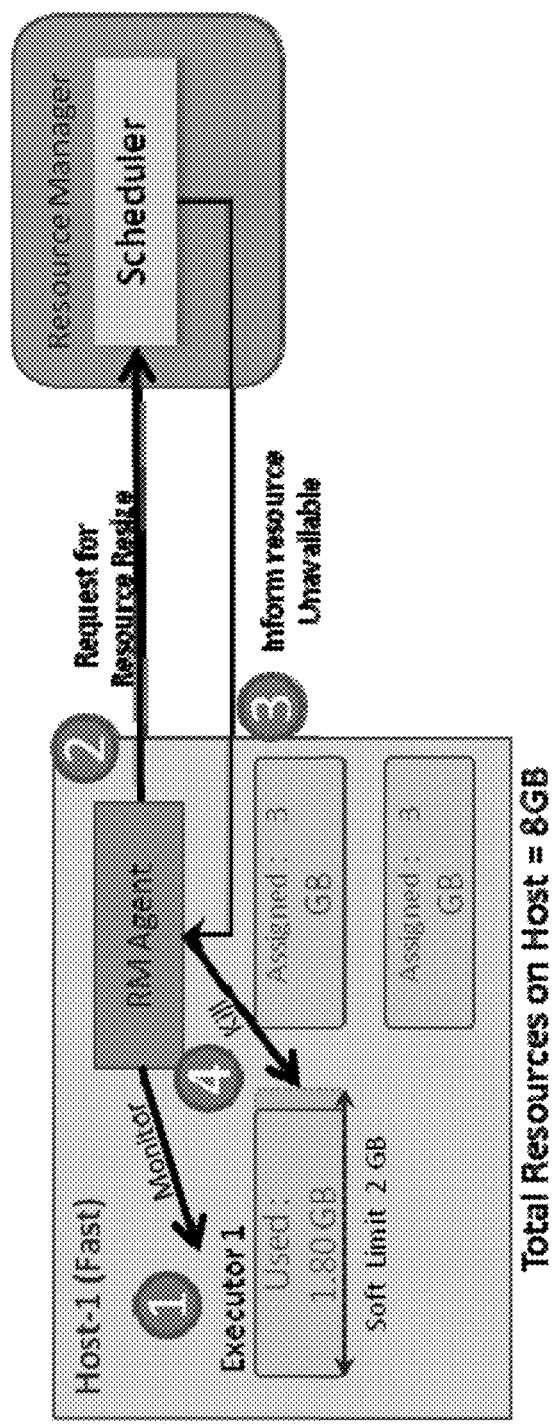
FIG. 12 illustrates a block diagram of the task executor exceeding the soft-limit—buffer but no resource in the RM Agent, in accordance with an embodiment of the present subject matter.

Referring now to FIG. 12, a block diagram of the task executor exceeding the soft-limit-buffer however as there is no resource in the node the task will be killed with adding it to the failed attempt and new task attempt will be scheduled is illustrated, in accordance with an embodiment of the present subject matter.

Figure 13:
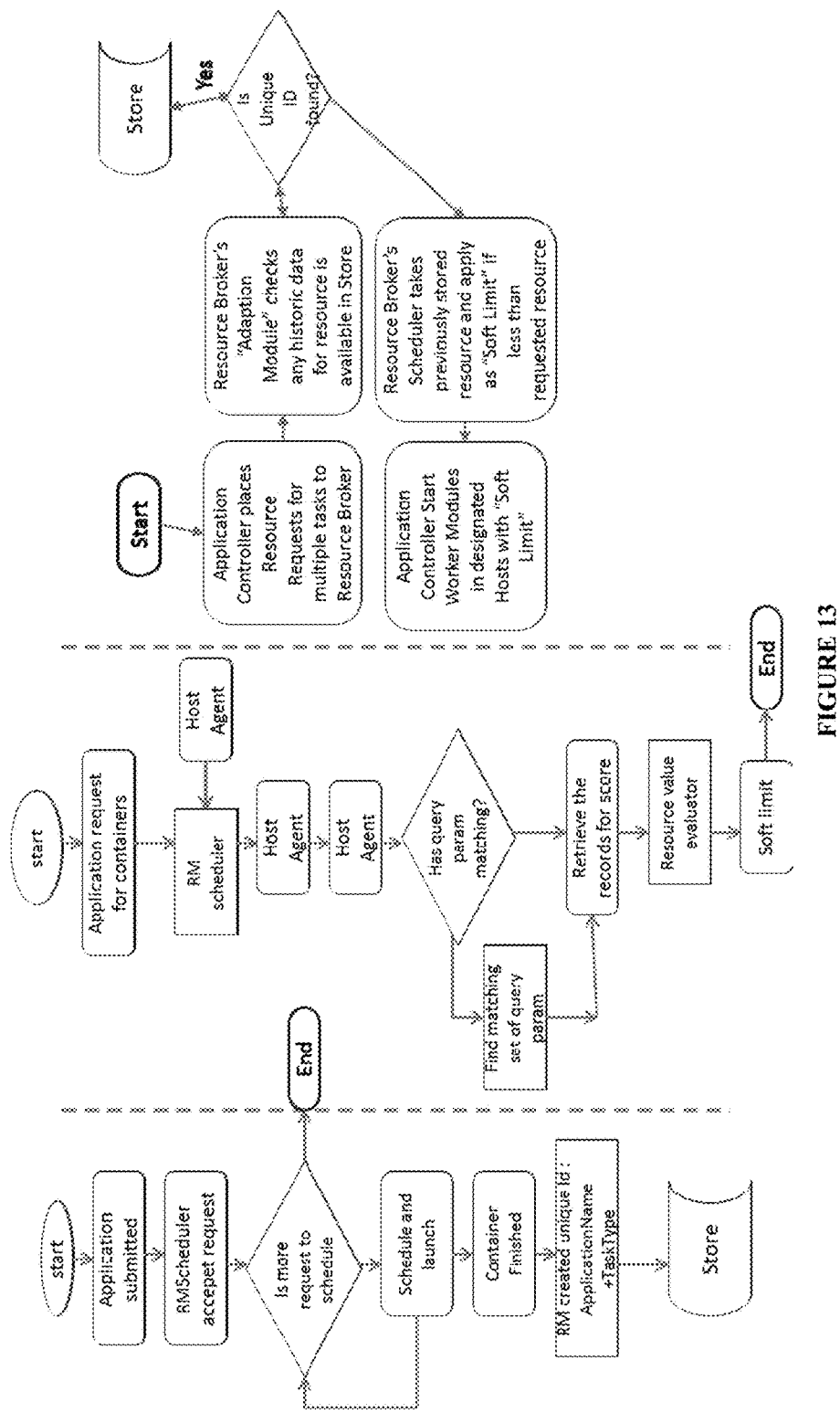
FIG. 13 illustrates overall flow charts of the adaptive resource handling, in accordance with an embodiment of the present subject matter.

FIG. 13 illustrates overall flow charts of the adaptive resource handling, in accordance with an embodiment of the present subject matter. As shown in FIG. 13, in the first step the RM agent while monitoring the task execution identifies the executor is exceeding the limit (Soft-Limit—configurable buffer). In the next step, as the used resource is less than hard Limit it will request scheduler for resizing the resource allocated to the executor. In the next step, the scheduler checks and finds that there is no resource to be allocated for resizing, hence it will inform to kill. In the next step, the RM Agent will kill the executor but will not be counted as failure. In the final step, scheduler tries to reschedule it by allocating it with some other free resource.

Figure 14:
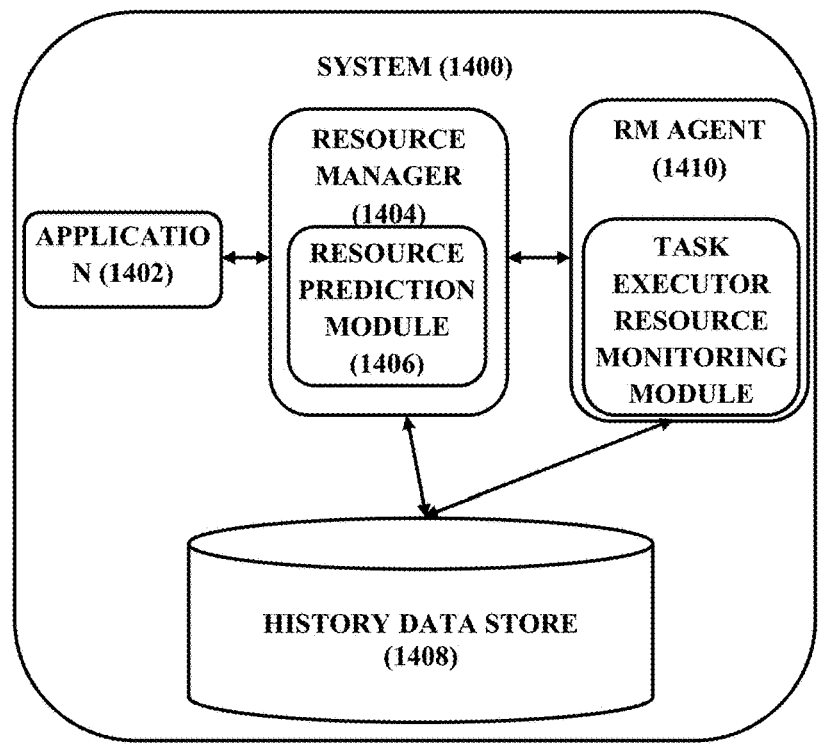
FIG. 14 illustrates a system for adaptive resource management, in accordance with an embodiment of the present subject matter.

Referring now to FIG. 14 a system for adaptive resource management is illustrated, in accordance with an embodiment of the present subject matter. Although the present subject matter is explained considering that the present invention is implemented in a system 1400 or a resource manager 1402 or a RM Agent 1410, it may be understood that the system 1400 or the resource manager 1402 or the RM Agent 1410 may also be implemented in a variety of computing systems, such as a laptop computer, a desktop computer, a notebook, a workstation, a mainframe computer, a server, a network server, and the like. It will be understood that the system 1400 or the resource manager 1402 or the RM Agent 1410 may be accessed by multiple users, or applications residing on the system 1400 or the resource manager 1402 or the RM Agent 1410. Examples of the system 1400 or the resource manager 1402 or the RM Agent 1410 may include, but are not limited to, a portable computer, a personal digital assistant, a handheld device, sensors, routers, gateways and a workstation. The system 1400 or the resource manager 1402 or the RM Agents 1410 are communicatively coupled to each other and/or other devices or a nodes or apparatuses to form a network (not shown).

In one implementation, the network (not shown) may be a wireless network, a wired network or a combination thereof. The network can be implemented as one of the different types of networks, such as GSM, CDMA, LTE, UMTS, intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In one implementation, the present disclosure provides a system 1400 for adaptive resource management. The system 1400 comprises a resource manager 1404 and a task executor resource monitoring module 1412 residing in the RM Agent 1410. The resource manager 1404 is configured to receive at least one resource request from at least an application 1402, the application 1402 is received with at least an application name and a tag, and the resource request contains at least a resource requirement of an application task for execution. The resource manager 1404 also comprises a resource prediction module 1406 configured to provide at least a soft limit for application task based on at least a historical resource usage statistics pre-stored in a history data store 1408 or return to a hard limit for application task configured by at least one user; and allocate at least one resource from the RM Agent 1410 identified for execution. The RM Agent, upon allocation, configured to execute the application task based at least on the soft limit or the hard limit, and comprises a task executor resource monitoring module 1412 configured to monitor at least a resource usage of the application task during execution; and store at least a resource usage statistics of the application task in the history data store 1408 against the tag.

Figure 15:
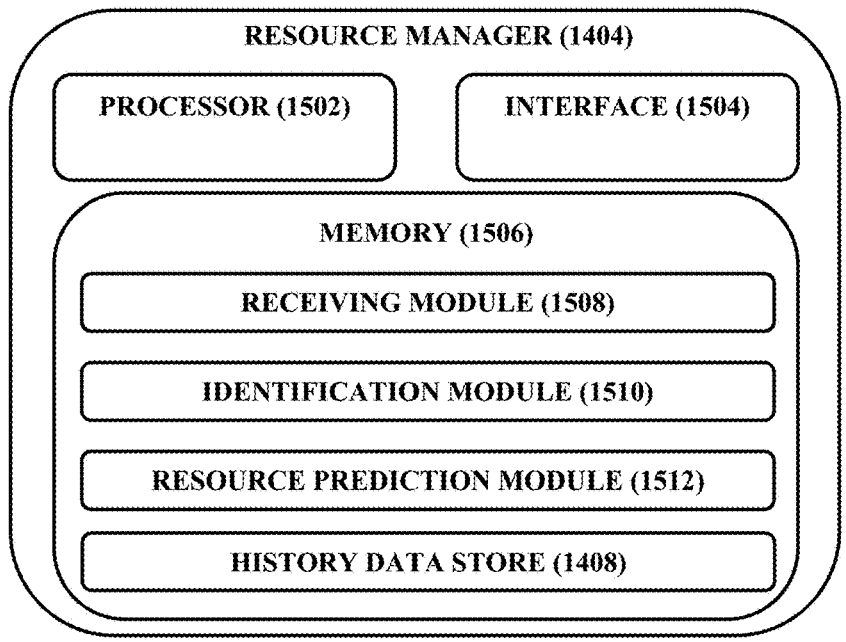
FIG. 15 illustrates a resource manager for adaptive resource management, in accordance with an embodiment of the present subject matter.

Referring now to FIG. 15 a resource manager for adaptive resource management is illustrated, in accordance with an embodiment of the present subject matter. In one implementation a resource manager 1404 for adaptive resource management is disclosed. The resource manager comprises a processor 1502; a memory 1506 coupled to the processor 1502 for executing a plurality of modules present in the memory. The plurality of modules comprises a receiving module 1508 configured to receive at least one resource request from at least an application, the application is received with at least an application name and a tag, and the resource request contains at least a resource requirement of an application task for execution; an identification module 1510 configured to identify at least one RM Agent for the execution of the application task; and a resource prediction module 1512 configured to provide at least a soft limit or a hard limit for application task based on at least a historical resource usage statistics pre-stored in a history data store 1408; and allocate at least one resource from the RM Agent identified for execution based on the soft limit or a hard limit for application task.

Figure 16:
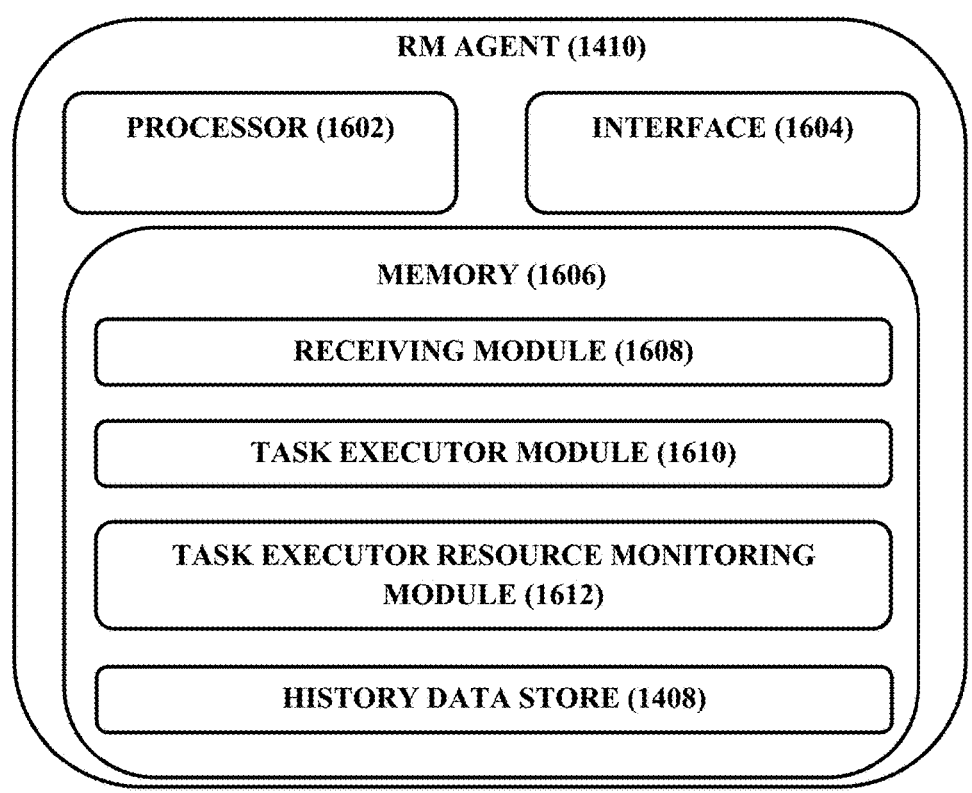
FIG. 16 illustrates a RM Agent for executing at least one application task allocated for execution, in accordance with an embodiment of the present subject matter.

Referring now to FIG. 16 a RM Agent for executing at least one application task allocated for execution is illustrated, in accordance with an embodiment of the present subject matter. In one implementation, the present disclosure provides a RM Agent 1410 for executing at least one application task allocated for execution. The RM Agent comprises a processor 1602, and a memory 1606 coupled to the processor 1602 for executing a plurality of modules present in the memory 1606. The plurality of modules comprises a receiving module 1608 configured to receive at least an application task for execution based at least on a soft limit or a hard limit; a task executor module 1610 configured to execute the application task, the task executor module is allocated based on the soft limit or the hard limit (hard limit and if possible soft limit, the hard limit will be as mentioned by a user); a task executor resource monitoring module 1612 configured to monitor at least a resource usage of the resource allocated for execution; and store at least a resource usage statistics of the resource allocated in a history data store 1408 against the application name and the application task executed.

In one implementation, the resource requirement of an application task is selected at least from a memory, input/output (I/O) process, central processing unit (CPU), or any combination thereof.

In one implementation, the soft limit or the hard limit for the application task is provided by matching the resource requirement of an application task received with at least the application name, the application task, the RM Agent, a RM Agent type, or any combination thereof, pre-stored in a history data store.

In one implementation, if match found, the resource prediction module is further configured to: apply at least a configurable formula associated with the resource usage to identify the soft limit of the application task received, the configurable formula is preferably selected form maximum, average, standard deviation, or any combination thereof.

In one implementation, if match not found, the resource prediction module is further configured to generate at least a confidence score for different set of historical resource usage pre-stored in a history data store associated with the application; select a best confidence score from the confidence score generated; and thereby apply at least a configurable formula associated with the resource usage to identify the soft limit of the application task received.

In one implementation, if the resource usage of the resource allocated for execution exceeds the soft limit, the RM Agent is further configured to allocate at least one other resource for the execution of the application task.

In one implementation, if the resource usage of the resource allocated for execution exceeds the hard limit, the execution of the application task is stopped/killed.

In one implementation, the tag comprises a task type identifying a given task of the application; the resource usage will be based on the task time.

In one implementation, the resource usage statistics comprises at least an application name, application identification, application task type, the tag, a resource provided type, or any combination thereof.

The resource manager 1402 or the RM Agent 1410 illustrated in accordance with an embodiment of the present subject matter, may include a processor, an interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions or modules stored in the memory.

The interface (I/O interface) 1504 and/or 1604 may include a variety of software and hardware interfaces, for example, a web interface, a graphical user interface, and the like. The I/O interface may allow the resource manager 1402 or the RM Agent 1410 to interact with a user directly. Further, the I/O interface may enable the resource manager 1402 or the RM Agent 1410 to communicate with other devices or nodes, computing devices, such as web servers and external data servers (not shown). The I/O interface can facilitate multiple communications within a wide variety of networks and protocol types, including wired networks, for example, GSM, CDMA, LAN, cable, etc., and wireless networks, such as WLAN, cellular, or satellite. The I/O interface may include one or more ports for connecting a number of devices to one another or to another server. The I/O interface may provide interaction between the user and the resource manager 1402 or the RM Agent 1410 via, a screen provided for the interface.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include plurality of instructions or modules or applications to perform various functionalities. The memory includes routines, programs, objects, components, data structures, etc., which perform particular tasks or implement particular abstract data types.

Figure 17:
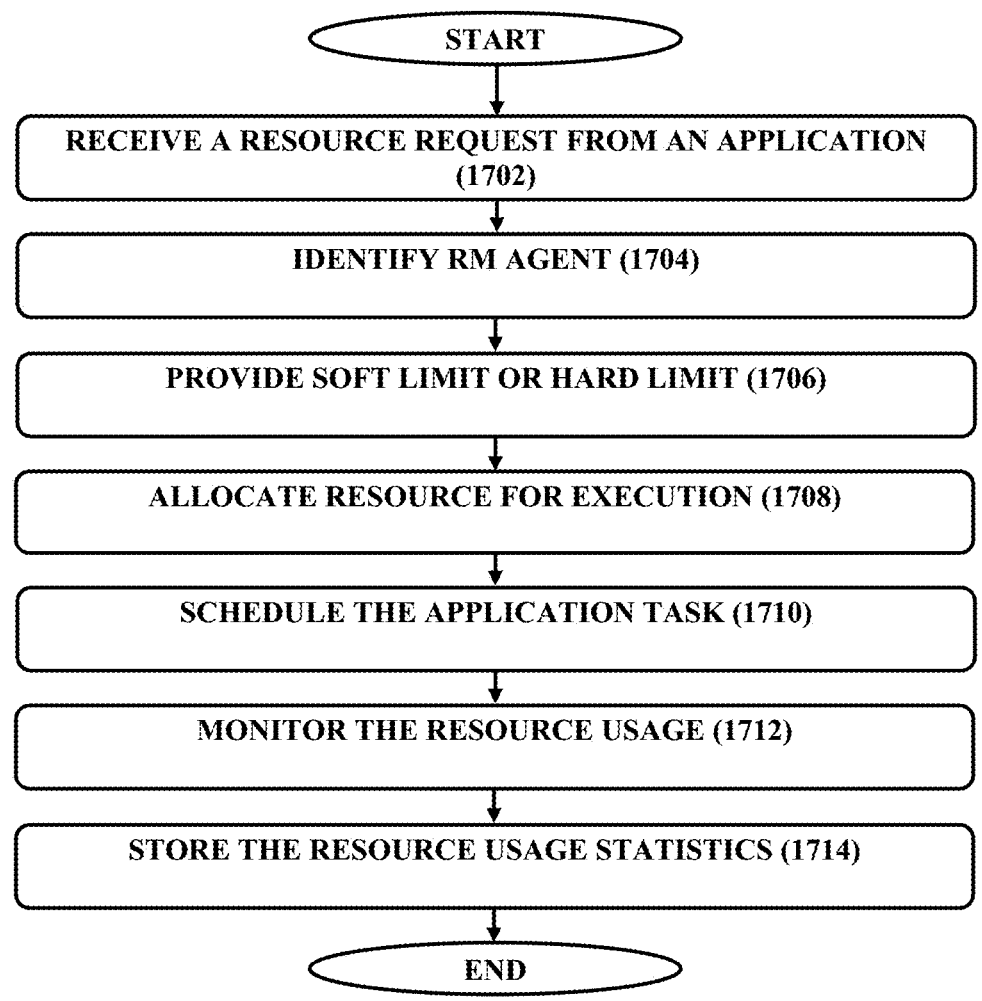
FIG. 17 illustrates a method for adaptive resource management, in accordance with an embodiment of the present subject matter.

FIG. 17 illustrates a method for adaptive resource management, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described system 1400 or the resource manager 1402 or the RM Agent 1410.

In one implementation, the present disclosure provides method for adaptive resource management.

At block 1702, at least one resource request from at least an application is received. The application is received with at least an application name and a tag, and the resource request contains at least a resource requirement of an application task for execution. The resource requirement of an application task is selected at least from a memory, input/output (I/O) process, central processing unit (CPU), or any combination thereof. The tag comprises a task type identifying a given task of the application the resource usage will be based on the task time.

At block 1704, at least one RM Agent is identified for the execution of the application task.

At block 1706, at least a soft limit for application task based on at least a historical resource usage statistics pre-stored in a history data store or a hard limit for application task configured by at least one user is provided for application task. The soft limit or the hard limit for the application task is provided by matching the resource requirement of an application task received with at least the application name, the application task, the RM Agent, a RM Agent type, or any combination thereof, pre-stored in a history data store. Further, if match is found, the method further applies at least a configurable formula associated with the resource usage to identify the soft limit of the application task received, the configurable formula is preferably selected form maximum, average, standard deviation, or any combination thereof. If match is not found, the method generates at least a confidence score for different set of historical resource usage pre-stored in a history data store associated with the application, selects a best confidence score from the confidence score generated; and thereby apply at least a configurable formula associated with the resource usage to identify the soft limit of the application task received.

At block 1708, at least one resource from the RM Agent identified is allocated for execution.

At block 1710, the application task is scheduled based at least on the soft limit or the hard limit.

At block 1712, at least a resource usage of the application task during execution is monitored. If the resource usage of the resource allocated for execution exceeds the soft limit, the RM Agent is further configured to allocate at least one other resource for the execution of the application task. Further, if the resource usage of the resource allocated for execution exceeds the hard limit, the execution of the application task is stopped/killed.

At block 1714, at least a resource usage statistics of the application task is stored in the history data store against the tag. The resource usage statistics may include at least an application name, an application identification, application task type, the tag, a resource provided type, or any combination thereof.

In one implementation, a method for adaptive resource management, by the resource manager, is disclosed. The method comprises:
  receiving at least one resource request from at least an application, the application is received with at least an application name and a tag, and the resource request contains at least a resource requirement of an application task for execution;
  identifying at least one RM Agent for the execution of the application task; providing at least a soft limit or a hard limit (if soft limit is not available) for application task based on at least a historical resource usage statistics pre-stored in a history data store; and
  allocating at least resource from the RM Agent identified for execution based on the soft limit or a hard limit for application task.

In one implementation, a method for executing at least one application task allocated for execution, by the RM Agent, is disclosed. The method comprises:
  receiving at least an application task for execution based at least on a soft limit or a hard limit (hard limit and if possible soft limit, the hard limit will be as mentioned by a user);
  executing the application task, the task executor module is allocated based on the soft limit or the hard limit;
  monitoring at least a resource usage of application task during execution; and storing at least a resource usage statistics of the application task in a history data store against the tag.

In contrast to the prior-art techniques, available if any, the present disclosure provides an adaptive resource handling for applications being executed in distributed systems so as to ensure efficient resource utilization by:
  providing a framework in which the resource managers can participate in identifying application uniquely using tags such that resource adaptation is more effective.
  providing a framework to collect and store resource statistics for each unique application's task against various parameters like Node type, User defined application and task tags etc.
  providing a framework where in resource monitoring is done based on historical statistics collected.
  providing a framework where in resource management is done based on historically identified resource usage limits. If exact match for the records are not found then based on confidence score the present disclosure will identify the limits.

providing a framework where each RM agent receives the workers (task executors) to be launched with both limits: given by the application (hard limit) and by the historical statistics (soft limit). Further, the RM agents ensures that the task executors does not exceed its hard limits and when executors exceeds the soft limit agent tries dynamically resizes the resource allocated to the executor.

Apart from what is explained above, the present disclosure also include the below mentioned advantages or the present disclosure enables to achieve:

Better utilization of hardware resources (do more with less) by faster execution of application, and by enabling to handle more tasks with same hardware resources.

No manual intervention/monitoring needed to optimize application parameters and thereby enable to achieve better efficiency of operations staff.

A person skilled in the art may understand that any known or new algorithms by be used for the implementation of the present disclosure. However, it is to be noted that, the present disclosure provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present invention. The foregoing storage medium includes: any medium that can store program code, such as a USB flash drive, a removable hard disk, a read-only memory (ROM), a random access memory (RAM), a magnetic disk, or an optical disc.

Although implementations for adaptive resource management in distributed computing systems have been described in language specific to structural features and/or methods, it is to be understood that the appended claims are not necessarily limited to the specific features or methods described. Rather, the specific features and methods are disclosed as examples of implementations of the adaptive resource management in distributed computing systems.

We claim:

1. A system for adaptive resource management, the system comprising a resource manager (RM) and at least one RM Agent, wherein:
the resource manager (RM) is configured to:
receive at least one resource request from at least one application, wherein the application comprises an application name and a tag, and the resource request comprises a resource requirement of an application task for execution;
provide at least a soft limit for the application task based on at least a historical resource usage statistics pre-stored in a history data store or return to a hard limit for the application task configured by at least one user; and
allocate at least one resource from the RM Agent identified for execution of the application task, wherein the RM is configured to allocate at least one other resource for the execution of the application task from the RM Agent identified when resource usage of the resource allocated for execution exceeds the soft limit; and
the RM Agent is configured to:
execute the application task based at least on the soft limit or the hard limit;
monitor the application task during execution; and
store a resource usage statistics of the resource of the application task against the tag.

2. The system as claimed in claim 1, wherein the resource requirement of the application task is selected from at least one of a memory, input/output (I/O) process, or central processing unit (CPU).

3. The system as claimed in claim 1, wherein the soft limit or the hard limit for the application task is provided by matching the resource requirement of an application task with at least one of the application name, the application task, the RM Agent, or a RM Agent type, pre-stored in the history data store.

4. The system as claimed in claim 3, wherein the resource manager is further configured to: apply a configurable formula associated with resource usage to identify the soft limit of the application task when a match is found.

5. The system as claimed in claim 3, wherein when a match is not found, the resource manager is further configured to:
generate a confidence score for different set of historical resource usage pre-stored in the history data store associated with the application;

select a best confidence score from the confidence score generated; and apply a configurable formula associated with resource usage to identify the soft limit of the application task.

6. The system as claimed in claim 1, wherein if resource usage of the resource allocated for execution exceeds the hard limit, the execution of the application task is stopped or killed.

7. The system as claimed in claim 1, wherein the tag comprises a task type identifying a given task of the application.

8. The system as claimed in claim 1, wherein the resource usage statistics comprises at least one of the application name, an application identification, application task type, the tag, or a resource provided type.

9. A resource manager (RM) for adaptive resource management, the resource manager comprising:
a processor;
a memory coupled to the processor for executing a plurality of instructions stored in the memory, wherein the processor executes the instructions to:
receive at least one resource request from at least one application, wherein the application comprises an application name and a tag, and the resource request comprises a resource requirement of an application task for execution;
provide at least a soft limit for the application task based on at least a historical resource usage statistics pre-stored in a history data store or return to a hard limit for the application task configured by at least one user; and
allocate, based on the soft limit or a hard limit, at least one resource for execution of the application task from at least one RM Agent identified, wherein the processor executes the instructions to allocate at least one other resource for the execution of the application task from at least one RM Agent identified when resource usage of the resource allocated for execution exceeds the soft limit.

10. The resource manager as claimed in claim 9, wherein the resource requirement of the application task is selected from at least one of a memory, input/output (I/O) process, or central processing unit (CPU).

11. The resource manager as claimed in claim 9, the soft limit or the hard limit for the application task is provided by matching the resource requirement of the application task with at least one of the application name, the application task, the RM Agent, or a RM Agent type, pre-stored in the history data store.

12. The resource manager as claimed in claim 11, wherein if a match is found, the processor executes the instructions to: apply a configurable formula associated with resource usage to identify the soft limit of the application task.

13. The resource manager as claimed in claim 11, wherein if match not found, the processor executes the instructions to:

generate a confidence score for different set of historical resource usage pre-stored in the history data store associated with the application;

select a best confidence score from the confidence score generated; and apply a configurable formula associated with resource usage to identify the soft limit of the application task.

14. The resource manager as claimed in claim 9, wherein if resource usage of the resource allocated for execution exceeds the hard limit, an execution of the application task is stopped or killed.

15. The resource manager as claimed in claim 9, wherein the tag comprises a task type identifying a given task of the application.

16. The resource manager as claimed in claim 9, wherein the historical resource usage statistics comprises at least one of the application name, an application identification, application task type, the tag, or a resource provided type.

17. A method for adaptive resource management (RM), the method comprising:
receiving at least one resource request from at least an application, wherein the application comprises an application name and a tag, and the resource request contains at least a resource requirement of an application task for execution;
identifying at least one RM Agent for the execution of the application task;
providing at least a soft limit for the application task based on at least a historical resource usage statistics pre-stored in a history data store or a hard limit for the application task configured by at least one user;
allocating at least one resource from the RM Agent identified for execution of the application task, wherein the allocating at least one resource from the RM Agent identified for execution of the application task comprises: when resource usage of the resource allocated for execution exceeds the soft limit, allocating at least one other resource from the RM Agent identified for the execution of the application task;
scheduling the application task based at least on the soft limit or the hard limit;
monitoring a resource usage of the application task during for execution; and
storing a resource usage statistics of the application task in the history data store against tag.

18. The method as claimed in claim 17, wherein the soft limit or the hard limit for the application task is provided by matching the resource requirement of the application task with at least one of the application name, the application task, the RM Agent, or a RM Agent type, pre-stored in the history data store.

19. The method as claimed in claim 18, wherein the method further comprises applying a configurable formula associated with resource usage to identify the soft limit of the application task when a match is found.

* * * * *